(12) United States Patent
Lin et al.

(10) Patent No.: US 8,131,828 B2
(45) Date of Patent: Mar. 6, 2012

(54) SELECTIVELY JOINING CLIENTS TO MEETING SERVERS

(75) Inventors: Jian Lin, Pleasant Hill, CA (US); Zheng Yuan, San Jose, CA (US); Weixin Xia, Fremont, CA (US); Yongya Wang, Zhejiang (CN); Sihai Xiao, Fremont, CA (US); Ilan Kasan, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 62 days.

(21) Appl. No.: 12/245,595

(22) Filed: Oct. 3, 2008

(65) Prior Publication Data
US 2010/0088414 A1 Apr. 8, 2010

(51) Int. Cl.
G06F 15/177 (2006.01)
G06F 15/173 (2006.01)
H04L 12/16 (2006.01)
H04N 7/14 (2006.01)

(52) U.S. Cl. ........ 709/220; 709/229; 709/239; 370/270; 348/14.08

(58) Field of Classification Search .................... 709/220
See application file for complete search history.

(56) References Cited

U.S. PATENT DOCUMENTS

| | | | | |
|---|---|---|---|---|
| 5,867,495 A * | 2/1999 | Elliott et al. | .................. | 370/352 |
| 5,874,960 A | 2/1999 | Mairs et al. | | |
| 6,310,862 B1 * | 10/2001 | Roy | .............. | 370/260 |
| 6,735,633 B1 * | 5/2004 | Welch et al. | .................. | 709/233 |
| 7,441,270 B1 * | 10/2008 | Edwards et al. | ................ | 726/15 |
| 7,627,629 B1 * | 12/2009 | Wu et al. | ........... | 709/204 |
| 2002/0075844 A1 * | 6/2002 | Hagen | .......... | 370/351 |
| 2002/0133611 A1 * | 9/2002 | Gorsuch et al. | .............. | 709/231 |
| 2003/0072429 A1 * | 4/2003 | Slobodin et al. | ......... | 379/202.01 |
| 2003/0084104 A1 * | 5/2003 | Salem et al. | .................. | 709/205 |
| 2003/0105812 A1 * | 6/2003 | Flowers et al. | ............... | 709/203 |
| 2003/0167305 A1 * | 9/2003 | Zhu et al. | ...................... | 709/205 |
| 2004/0165768 A1 * | 8/2004 | Zhang et al. | .................. | 382/162 |
| 2005/0262201 A1 * | 11/2005 | Rudolph et al. | .............. | 709/205 |
| 2005/0288961 A1 * | 12/2005 | Tabrizi | .............. | 705/1 |
| 2006/0050686 A1 * | 3/2006 | Velez-Rivera et al. | ......... | 370/352 |
| 2007/0239825 A1 * | 10/2007 | Walter | ........... | 709/204 |
| 2007/0285503 A1 * | 12/2007 | Asthana et al. | ............. | 348/14.08 |
| 2008/0034104 A1 * | 2/2008 | Kariti et al. | .................... | 709/231 |
| 2008/0104545 A1 * | 5/2008 | Palmieri et al. | ............... | 715/847 |
| 2008/0120370 A1 * | 5/2008 | Chan et al. | ..................... | 709/204 |
| 2009/0210490 A1 * | 8/2009 | Hawkins et al. | .............. | 709/204 |

OTHER PUBLICATIONS

U.S. Appl. No. 12/205,741, filed Sep. 5, 2008, Office Action, mailed Aug. 16, 2011.

* cited by examiner

*Primary Examiner* — Ario Etienne
*Assistant Examiner* — Blake Rubin
(74) *Attorney, Agent, or Firm* — Hickman Palermo Truong & Becker LLP

(57) ABSTRACT

In an embodiment, a hosted-on-premises meeting exchange server operates seamlessly with web meeting servers. For example, one computer-implemented method comprises receiving a request from a client computer to join a web meeting; determining whether the client computer is coupled to a local network which includes an on-premises-meeting exchange server; in response to determining that the client computer is coupled to the local network, joining the client computer to the web meeting at the on-premises-meeting exchange server when the on-premises-meeting exchange server has sufficient capacity, and otherwise joining the client computer to the web meeting at an off-premises-meeting exchange server; and in response to determining that the client computer is not coupled to the local network, joining the client computer to the web meeting at the off-premises-meeting exchange server.

15 Claims, 4 Drawing Sheets

SELECTIVELY JOINING CLIENTS TO MEETING SERVERS

TECHNICAL FIELD

The disclosure generally relates to hosting meetings over computer networks.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

As computer networks such as the Internet expand and communication capabilities broaden, online meetings and web conferences held over networks are becoming more popular. web meetings can involve attendees from all over the world. Example web meeting systems include WebEx, Microsoft Live Meeting, Citrix GoToMeeting, Raindance, Adobe Acrobat Connect Professional, etc. The expansion of web conferencing has led to concerns related to data security, data access, information exchange control, etc. In particular, the security of information exchanged during web conferences concerns those who participate in web conferences.

In one approach a WebEx EMX unit could be installed on a customer premises. However, the EMX unit required setting up a private network connection between the EMX unit and the WebEx hosted network, involving significant cost, introducing security issues, and providing non-scalable complexity. The EMX unit would not be fully isolated in the customer's because of the private network connection, so that potentially users from outside the company firewall could join a meeting.

DETAILED DESCRIPTION

Approaches for selectively joining clients to meeting servers are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
  1.0 General Overview
  2.0 Structural and Functional Overview
  3.0 Implementation examples
    3.1 Handling a request from a client to join a meeting
    3.2 Joining a meeting
  4.0 Implementation Mechanisms—Hardware Overview
  5.0 Extensions and Alternatives

---

1.0 General Overview

In an embodiment, a computer-implemented method comprises receiving a request from a client computer to join a web meeting; determining whether the computer client may join the web meeting at an on-premises-meeting exchange server, or at an off-premises-meeting server; allowing the client computer to join the on-premises-meeting if the on-premises-meeting exchange server has not reached a maximum number of attendees and if the client computer is authorized to join the on-premises-meeting; allowing the client computer to join the off-premises-meeting if the off-premises-meeting exchange server has not reached a maximum number of attendees and if the client computer is authorized to join the off-premises-meeting.

In an embodiment, a connection between the on-premises-meeting exchange server and the off-premises-meeting exchange server uses secure socket layer (SSL) protocol.

In an embodiment, the client computer is joined to the on-premises-meeting server when the client computer Internet Protocol (IP) address is within the same subnet as an IP address of the hosted on-premises-meeting exchange server.

In an embodiment, the invention encompasses a computer apparatus, a computer system, and a computer-readable storage medium configured to perform the functions described above.

2.0 Structural and Functional Overview

Figure 1:
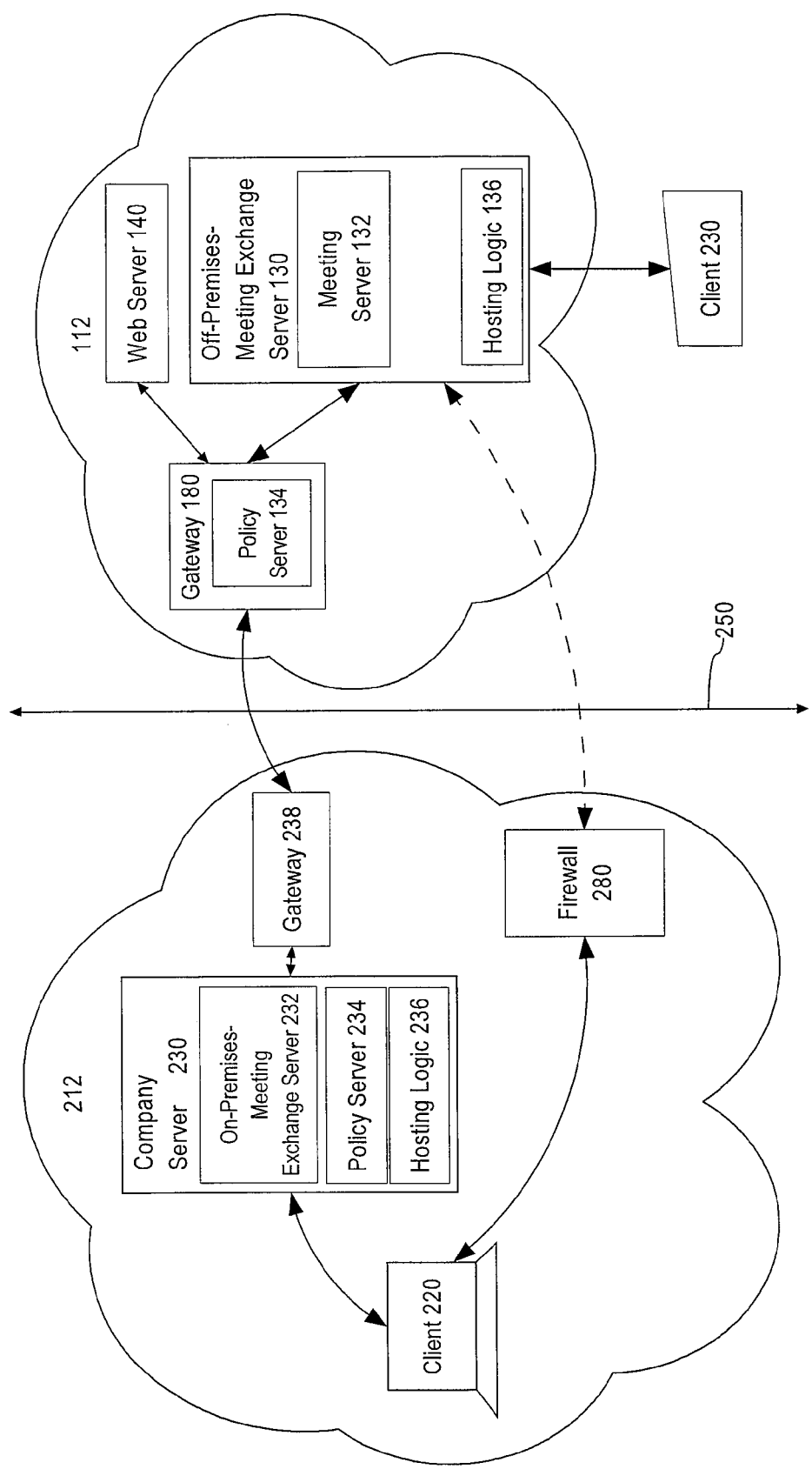
FIG. 1 illustrates an example system configured for selectively joining clients to meeting servers.

FIG. 1 illustrates an example system configured for selectively joining clients to meeting servers. Using the system of FIG. 1 operated in accordance with logic described further herein, in one embodiment, a hosted-on-premises-meeting exchange solution that works seamlessly with a hosted meeting service may be implemented.

In FIG. 1, a remote network 112 having one or more remote clients 320 is coupled to a local network 212 that comprises one or more local clients 220 and at least one company server 230. The term "company" is used to indicate that in one embodiment the server 230 is associated with a business enterprise, but server 230 also may be used by any other kind of user or institution. In one embodiment, local network 212 is local to the company, business enterprise, user or institution, and remote network 112 is located elsewhere. Remote network 112 may be associated with a data center, service provider, or hosted meeting service. Local network 212 and remote network 112 also may represent different domains, such as security domains, of the same enterprise or institution. In an embodiment, local network 212 is local to a client 220 that is attempting to join a web meeting that involves client 320. The company server 230 represents a "home" location for serving web conferences and meetings from the perspective of client 220.

In an embodiment, remote network 112 is a domain of a service provider that is logically separated from the local network 212 by one or more public internetworks such as the internetworks popularly known as the Internet. For example, remote network 112 may be a domain of a commercial web meeting service provider, such as WebEx.

The local clients 220 of local network 212 are communicatively coupled to the company server 230. Each client 220 may be implemented using any of various client computers including but not limited to devices that are physically connected to the company server 230, as well as various wireless devices, which can communicate with the company server

230 over wireless links. Examples of computers physically connected to the network may include a personal computer (PC), laptop, main frame computer, etc. Examples of wireless devices may include a personal digital assistant (PDA), BlackBerry, IPhone, smartphone, etc. Any device capable of interfacing with company server 230 may be used as client 220.

The company server 230 may be implemented using a general purpose computer that is configured as described herein. The company server 230 may include one or more network interfaces to handle requests and other traffic generated by and received from the clients 220. In an embodiment, company server 230 hosts one or more applications to facilitate communications within the local network 212, and between the local network 212 and the remote network 112. In an embodiment, company server 230 facilitates sharing of local network resources among clients 220, and provides security measures to protect the information stored in the local network 112.

In an embodiment, clients 220 and company server 230 exchange data over communication links that may use any of various wired and wireless communication technologies, according to any of various communication protocols including but not limited to Internet Protocol (IP) and Transmission Control Protocol (TCP). In one embodiment, communication links between client 220 and company server 230 may use secure sockets layer (SSL) protocol or transport layer security (TLS).

In an embodiment, company server 230 comprises one or more on-premises-meeting exchange servers 232, a policy server 234 and hosting logic 236, which are communicatively coupled to one another to exchange information including data and instructions. There may be any number of on-premises meeting exchange servers 232, or server instances, hosted in company server 230 to accommodate various numbers of clients 220, 230 in web conferences and other applications. In an embodiment, company server 230 also may comprise an HTTP server that is configured to provide a policy management interface and/or administrative user interface to an administrator or client computer. Thus, by interacting with the HTTP server and one or more applications hosted in the company server, an administrator may configure the company server 230, change option settings, view logs and report data, etc.

The on-premises-meeting exchange server 232 implements web conferencing functions and comprises one or more elements of software, firmware, hardware or a combination thereof. In an embodiment, on-premises-meeting exchange server 232 handles scheduling web conferences; hosting, joining, starting and ending web conferences; managing security of the information exchanged during web conferences; reconnecting the participants in case of connection failures; and other web conferencing functions. In an embodiment, on-premises-meeting exchange server 232 manages web conferences for clients that are within a local network that includes the exchange, but not for off-premises clients.

In an embodiment, the on-premises-meeting exchange server 232 supports one or more of: application sharing in a web conference; desktop sharing in a web conference; web content sharing for streamed content; audio conferencing; text chat; video conferencing; and related meeting and conferencing functions.

The policy server 234 may be implemented as a computer or process configured to provide authorization services and facilitates data tracking. The policy server 234 accepts access control requests, processes them against a formal set of statements which define how the network's resources are to be allocated among its clients, and returns access control responses. In the local network 212, the resources can be allocated by the policy server 234 based on the time of day, client authorization privileges, availability of network resources, and any other factors that the network manager may specify when composing the policy. With respect to files and documents, the policy server 234 can allow or deny access, control the extent to which a client can use the document, track client use patterns, log changes or modifications, provide automatic updates, eliminate unnecessary redundancy, minimize the need to re-issue documents, delete outdated data, etc.

Company server 230 further comprises hosting logic 236 that is configured to determine whether to join client 220 to the on-premises-meeting exchange server 232 or to the off-premises meeting exchange server 130 of remote network 112. In an embodiment, hosting logic 236 comprises one or more computer programs, other software elements, firmware, or a combination thereof that implement the functions that are further described herein. As one function, hosting logic 236 enables the on-premises-meeting exchange server 232 to organize web meetings for client 220 or other clients within local network 212 seamlessly in coordination with off-premises meeting exchange server 130. For example, clients can join meetings that are actually hosted in either location without the clients knowing or having to determine how to connect to the meeting servers in the different locations.

The local network 212 further comprises a firewall 280 communicatively coupled to the company server 230 and clients 220 to provide security and separation from one or more internetworks 250 that are logically interposed between the local network 212 and the remote network 112. The firewall 280 is responsible for inspecting network traffic passing to and from the local network 212, and either permitting or denying the passing of the information based on a set of rules that may implement different trust levels. The firewall 280 may be implemented as a packet filter firewall, stateful firewall, application layer firewall, proxy-based firewall, or using other firewall technology.

In an embodiment, firewall 280 is configured to block traffic from local clients 220 from reaching the off-premises meeting exchange server 130. Such a configuration effectively forces the local clients to join a meeting only using the on-premises meeting exchange server 232. However, in certain embodiments, if on-premises meeting exchange server 232 lacks sufficient capacity to host a meeting locally, then the hosting logic 236 may reconfigure the firewall 280, or send a message to an administrator or other system requesting reconfiguration, to allow the local client 220 to reach a hosted meeting exchange, such as meeting server 132 in off-premises meeting exchange server 130.

The remote network 112 comprises at least one off-premises meeting exchange server 130 that is configured to handle communication with the local network 212 and with remote clients 320. Each of the off-premises meeting exchange servers 130 may be implemented using a general-purpose computer configured with logic for hosting one or more web meetings, web conferences or other online meetings. In an embodiment, off-premises meeting exchange servers 130 are WebEx servers that can support online web meetings between a plurality of clients that are located in geographic locations other than the locations of the servers 130. Thus, the servers 130 are located off the premises of the clients 220 and clients 320.

In an embodiment, off-premises-meeting exchange server 130 comprises a meeting server 132, policy server 134, and hosting logic 136. Meeting server 132 may be configured in the manner described above for on-premises meeting exchange server 232, except that meeting server 132 exclusively handles online meetings for clients that are remote from the network 112. Policy server 134 may be configured as described above for policy server 234 except that policy server 134 implements policy for resources in remote network 112. Hosting logic 136 may be configured as described above for hosting logic 236.

In an embodiment, remote network 112 further comprises a gateway 180, which may be implemented as a computer or process configured to act as an entrance to the remote network 112. The gateway 180 controls traffic within the remote network 112, and the traffic between the local network 212 and the remote network. The gateway 180 may also act as a proxy server and a firewall server. The gateway 180 may be associated with or comprise a router and/or a switch.

In an embodiment, remote network 112 comprises a different instance of gateway 180 for each enterprise, customer, company or other institution that has a company server 230 and wishes to interoperate with off-premises-meeting exchange server 130. For example, a gateway 238 in local network 212 is coupled to a corresponding gateway 180 in remote network 112. Local gateway 238 provides an interface for the company server 230 to an off-premises meeting exchange server 130 so that the two servers can cooperate to transfer meeting information or to join clients in different locations to a meeting that is hosted in one of the servers. For example, if a remote client 320 wants to join a meeting that is hosted in the on-premises meeting server 232, the client 320 can reach the meeting by first contacting off-premises meeting exchange server 130 and being redirected through gateway 180 to gateway 238 and thus to the on-premises meeting exchange server 232. In this manner, remote client 320 can establish a reverse connection through the remote network 112 back to the local network 212 and participate in meetings that are locally hosted at the company server 230. Therefore, for example, employees of the company represented by local network 112 can participate in meetings that are securely hosted within the company premises on company server 230 even when the clients 320 of the employees are located elsewhere in the world.

Communications between gateway 238 and gateway 180 may use a secure protocol over an open network, such as SSL over HTTP (HTTPS) over a public internetwork such as the Internet. Thus, a private network or dedicated communication link is not needed between gateway 238 and gateway 180.

In an embodiment, remote network 112 comprises a web server 140 that may host applications, pages, or documents that provide a front-end interface for clients that wish to use the off-premises meeting exchange server 130. For example, web server 140 may host account management applications, billing applications, and marketing information for an enterprise that operates the remote network 112.

Communication links between the firewall 280 and the gateway 180 may be implemented in various embodiments by any of physical wired networks (including a Local Area Network (LAN), a Wide Area Network (WAN), etc.), wireless networks (including a wireless local-area network incorporating WiFi technology, etc.), or a combination of wired and wireless networks.

In operation, if client 320 wishes to connect to the remote network 112, client 320 sends a request to the remote network 112 that is processed by the gateway 180. If the request is authorized, the gateway 180 facilitates the communication between the remote client 320 and the off-premises-meeting exchange server 130. The client 320 may wish to connect to the off-premises-meeting exchange server 130 for a number of reasons. For example, the client 320 might want to schedule a web conference facilitated by the off-premises-meeting exchange server 130, or to participate in the already scheduled web conference. Furthermore, the client 320 might want to host a web conference, or be a member of the web conference hosted by someone else. Further, the client 320 might want to upload some information including files, data, etc., to the off-premises-meeting exchange server 130, receive information from the off-premises-meeting exchange server 130, or request resources available in the remote network 112.

Upon receiving a request from the client 320, the off-premises-meeting exchange server 130 performs functions which either handle or reject the request received from the client 320. For example, the off-premises-meeting server 130 may join the client 320 to a meeting that involves other clients 220, 320, or reject the request from the client. Further, the off-premises-meeting server 130 may schedule a web conference; allow the client 320 to host, start, or end the web conference; reconnect the client 320 to the web conference in case of the connection failed; or perform related functions.

Figure 2:
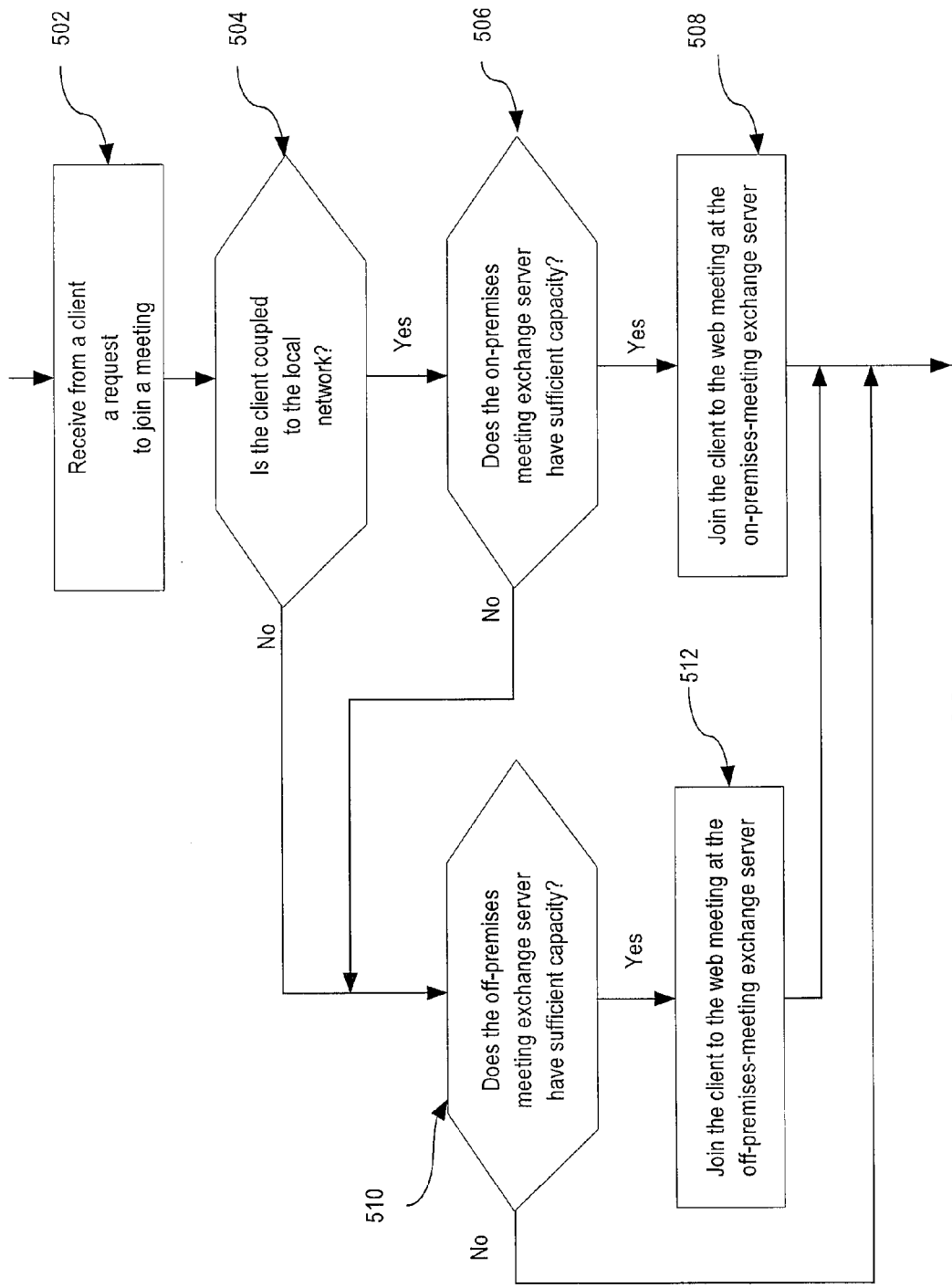
FIG. 2 illustrates a method of selectively joining clients to meeting servers.

3.0 Implementation Examples 3.1. Handling a Request from a Client to Join a Meeting FIG. 2 illustrates handling of a request received from a client computer. In FIG. 2, in step 502, meeting hosting logic receives from a client a request to join a web meeting. For purposes of step 502, a client request to join a meeting broadly encompasses a request to schedule a web meeting, cancel a web meeting, join a web meeting as a host, join a meeting as a member, etc. Various types of requests are described further herein in other sections.

In step 504, the meeting hosting logic determines whether the client is coupled to a local network. "Local," in this context, means local to a computer or network that includes the meeting hosting logic that is making the determination. In an embodiment, the client's location affects the way the meeting hosting logic handles the client's request; for example, a meeting exchange server may be selected based on the whether the client is associated with the local network or with a remote network.

The determination of the location of the client may be performed using several methods. For example, the meeting hosting logic may extract from the client's request an Internet Protocol (IP) address of the client's computer, and compare that address with the IP address of the server on which the meeting hosting logic is implemented, or compare the client address with a range of addresses of hosts in the local network 212. If the IP address of the client's computer and the IP address of the local server belong to the same local network, then the client computer is considered to be coupled to the local network. Otherwise, the client computer is considered to be coupled to another network, such as remote network 112.

Alternatively, step 504 may comprise identifying whether the client computer is listed on a configuration list that is maintained by the server residing on the local network.

If the client computer is coupled to the local network, then in step 506, the hosting logic initially assigns the client to the on-premises-meeting exchange server 232, and determines whether the on-premises-meeting exchange server 232 has sufficient capacity to handle the client's request.

The capacity of the on-premises-meeting exchange server 232 to process meetings might be limited by hardware configuration, software issues, or a combination. For example, the number of clients that the on-premises-meeting exchange server 232 can serve simultaneously might be capped, and determined by the value of a parameter identifying the maximum number of clients. In an embodiment, if serving the client's request does not exceed the maximum number of clients that the on-premises-meeting exchange server 232 can serve, then in step 508 the hosting logic joins the client to the web meeting at the on-premises-meeting exchange server.

However, if serving the client's request does exceed the maximum number of clients that the on-premises-meeting exchange server 232 can serve, so that the test of step 506 is negative, then the hosting logic 236 initially assigns the client's request to the off-premises-meeting exchange server 130. Similarly, if the client is not coupled to the local network, so that the test of step 504 is negative, then the hosting logic 236 initially assigns the client's request to the off-premises-meeting exchange server 130. Any available or known off-premises-meeting exchange server may be selected.

The negative branch of step 506 additionally may comprise reconfiguring a local firewall to permit the requesting client to reach an off-premises meeting exchange server. Thus, in certain embodiments, if on-premises meeting exchange server 232 lacks sufficient capacity to host a meeting locally, then the hosting logic 236 may reconfigure the firewall 280, or send a message to an administrator or other system requesting reconfiguration, to allow the local client 220 to reach a hosted meeting exchange, such as meeting server 132 in off-premises meeting exchange server 130.

In the step 510, the hosting logic determines whether the off-premises-meeting exchange server 130 has sufficient capacity to handle the client's request. Step 510 may be performed by the hosting logic 236 querying the server 130. Alternatively the hosting logic 236 may send the server 130 a client assignment message indicating that the client meeting has been assigned to the off-premises-meeting exchange server, and the server may reply with an error if the off-premises-meeting exchange server has insufficient capacity.

The capacity of the off-premises-meeting exchange server may be limited for any of the same reasons stated above for the on-premises-meeting exchange server 232.

If serving the client's request does not exceed the maximum number of clients that the off-premises-meeting exchange server 130 can serve, so that the test of step 510 is positive, then in step 512 the hosting logic joins the client to the off-premises-meeting exchange server. However, if serving the client's request does exceed the maximum number of clients that the server can serve, so that the test of step 510 is negative, then the client's request is rejected because no available server can serve the request.

The tests performed in steps of FIG. 2 may have different outcomes at different times. For example, it is possible that at the time of one client request, the local on-premises meeting exchange server may have sufficient capacity to host a meeting, whereas at a different time there is insufficient capacity and a different request of the same client or a different request may be redirected to an off-premises meeting exchange.

3.2 Joining a Meeting

Figure 3:
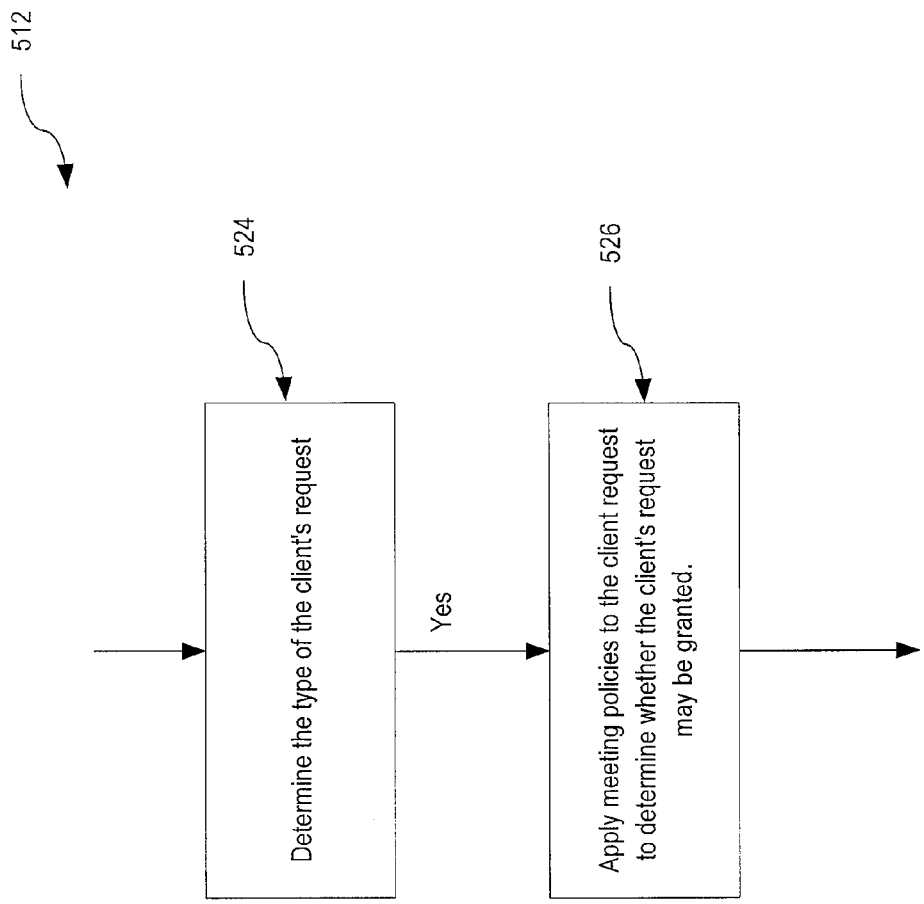
FIG. 3 illustrates handling a request received from a client computer.

FIG. 3 illustrates handling a request received from a client computer. In step 524, a meeting exchange server determines the type of the client's request. The meeting exchange server that performs FIG. 3 can be either the on-premises-meeting exchange server 232 or the off-premises-meeting exchange server 130.

For purposes of FIG. 3, a client's request refers broadly to requests to schedule a web meeting, cancel a web meeting, join a web meeting as a host, join a meeting as a member, etc. In response to receiving a client's request, the meeting exchange server determines whether the client wants to schedule a web meeting, cancel a web meeting, etc. The determination may be made based on the analysis of the content of the request, and comparing the content with identifiers of recognized request types.

In step 526 of FIG. 3, the meeting exchange server applies one or more meeting policies to the client request to determine whether the client's request may be granted. For example, if the client requests a scheduling a web meeting, the meeting exchange may verify if the client is authorized to schedule such a meeting. For example, verifying authorization may comprise determining whether the client is eligible to schedule a meeting, has paid a required fee, uploaded a required software application, has a minimal hardware configuration required to participate in a meeting, etc.

Similarly, if the client requests to join a meeting as a host, the meeting exchange server may verify whether the client is authorized to act as host of the particular web meeting. For example, verifying authorization for hosting may comprise determining whether the client is eligible to be a host of the meeting, paid a required fee, uploaded a required software application, has a minimal required hardware configuration for hosting, etc.

Further, if the client requests to join a meeting as a member, the meeting exchange server may verify whether the client is authorized to be a member of the particular web meeting. Verifying authorization for membership may comprise determining whether the client is eligible to be a member of the meeting, paid a required fee, uploaded a required software application, has a minimal hardware configuration required to be a member of the meeting, etc.

In one embodiment, meeting policies differentiate between clients that are coupled to the local network from the clients who are coupled to the remote network. In an embodiment, meeting policies may allow only clients that are coupled to the local network to join a meeting held at the on-premises-meeting exchange server. For example, a business enterprise that owns local network 212 can use policy to prohibit clients outside the firewall from joining a meeting, to ensure that meeting data is securely contained within the local network 212. Other meeting polices may allow only clients that are coupled to the local network to join the particular meeting held at the off-premises-meeting exchange server.

In an embodiment, meeting policies may allow only the clients coupled to the remote network to join a meeting held at the on-premises-meeting exchange server. Alternatively, meeting polices may allow only clients coupled to the remote network to join the particular meeting held at the off-premises-meeting exchange server.

In an embodiment, meeting policies may disallow any client coupled to the local network to join a meeting held at the off-premises-meeting exchange server. Other meeting polices may disallow any client coupled to the local network to join a meeting held at the off-premises-meeting exchange server.

In an embodiment, meeting policies may disallow exchanging any data with any client coupled to the local network if a meeting is held at the off-premises-meeting exchange server. Other meeting polices may disallow exchanging any data with any client coupled to the remote network if a meeting is held at the on-premises-meeting exchange server.

In an embodiment, meeting policies may disallow exchanging any data with any client coupled to the local network if a meeting is held at the off-premises-meeting exchange server and if that client does not communicate with the off-premises-meeting exchange using secure sockets layer (SSL) protocol. Other meeting polices may disallow exchanging any data to any client coupled to the remote network if the particular meeting is held at the on-premisesmeeting exchange server and if that client does not communicate with the on-premises-meeting exchange using secure sockets layer (SSL) protocol.

In an embodiment, the on-premises meeting exchange server 232 may be monitored and managed by an administrative user in remote network 112, such as an administrator in a remote data center that contains the off-premises meeting exchange server 130 and other units. In an embodiment, the hosting logic herein provides a seamless integration of the on-premise server 232 and hosted off-premises servers 130, thereby providing high availability services and scalable deployment for users.

In an embodiment, each on-premises meeting exchange server 232 may form one unit in a global distributed meeting environment. The server 232, while located in a firewall-protected local network 212, can be reached using authorized network communications through firewall 280 by users located anywhere in the world. Thus, remote workers of an enterprise that owns and operates the network 212 can join a meeting that is started on the on-premises meeting exchange server 232 from any location. Further, servers 232 can be clustered to provide high availability and scalability, and on-premises meeting exchange servers from different companies can be configured to communicate meeting information.

In an embodiment, the approaches herein enable institutions to reduce the amount of network traffic that is communicated outside the institution by restricting meeting traffic to a local network of the institution. When clients of the institution are restricted to meetings hosted on the on-premises meeting exchange, external network traffic is reduced, which may reduce network service costs of the institution and also make more bandwidth available for communications for which external contact is required. Institutions or other users can independently configure and establish new meeting domains on the local meeting exchange server without involvement of service provider personnel and without requiring a configuration change to a remote data center.

In an embodiment, a third party service provider can use the approaches herein to resell the services of the service provider that owns and operates the remote network 112.

In an embodiment, two institutions each implementing the approach herein can configure the respective company servers to interoperate and host a meeting at one server or the other while including meeting participants or users from either institution.

3.3 Web Conference Security Control

Embodiments may be used to implement effective yet flexible conference security control. For example, some institutions may wish to have single point of control for employees or users to join or start an online meeting with better security control. Such meetings may include those that use a first institution's own site or meetings with other institutions using meeting exchange servers or sites that do not belong to the first institution. In an embodiment, hosting logic 236 and policy server 234 may implement a customizable security policy arrangement for users who participate in meetings; the policy can distinguish attendees inside the institution or outside of the institution. For example, for employees from same company in the meeting, other attendee can get control of the user desktop. If an attendee is outside of the company firewall, then he or she will not be able to control the desktop. As another example, policy may restrict file transfer so that attendees outside of the company cannot download files from company sources during a meeting.

In an embodiment, the approaches of FIG. 1-FIG. 4 provide a single point at which users may join and start a meeting. For example, all company employees can be required to join a meeting using a single control point. The single control point enables an administrator to disable all online meeting access or operations for the whole company if necessary.

In an embodiment, the use of a customizable security policy implemented in policy server 234 allows an institution to control user behavior in a meeting; for example, the downloading of sensitive data or desktop operations may be controlled. Policy server 234 is further configured in an embodiment to permit different attendees to have different security profile in a meeting.

In one embodiment, communications from gateway 238 may traverse firewall 280 to gateway 180. In such an embodiment, firewall 280 may be configured to disallow direct traffic from local network 212 to the off-premises meeting exchange server 130, but to allow traffic from the local network to the gateway 180 of the remote network 112. For example, assume that off-premises meeting exchange server 130 has a DNS name in the domain *.webex.com and that the gateway 180 has a hostname of acme.gw.webex.com, and the name of the company that operates local network 212 is Acme. In this example, the network administrator of Acme would configure firewall 280 to DENY traffic from clients 220 to *.webex.com but PERMIT traffic from such clients to acme.gw.webex.com. Further, the firewall 280 and potentially other routers and switches in the local network 212 may be configured to redirect traffic from clients 220 and intended for *.webex.com to the company server 230 instead.

Gateways 238, 180 may be configured as SSL gateways. In this embodiment, the company server 230 may be configured to reroute all web-related HTTP requests from clients 220 to the gateway 180 via SSL, and the gateway 180 in the remote network 112 may forward the HTTP requests to their destinations. Security policies for such requests may be enforced at gateway 180 using policy server 134.

In an embodiment, hosting logic 236 is configured to reroute all meeting-related network traffic to the on-premises meeting exchange server 232 if a direct connection to off-premises meeting exchange server 130 is not allowed by policy. If the policy allows, then client 220 can connect to meeting servers 132 directly.

In an embodiment, gateway 238 enforces policy regarding client data downloads from the company server 230 or from specific locations in remote network 112 if a client download is necessary and the policy stored in policy server 234 specifies enforcement of download locations. In an embodiment, the on-premises meeting exchange server 232 enforces security policy and will not transfer certain data outside of local network 112 if requested by policy configured on policy server 234. The meeting server 232 may allow certain communication to be blocked between the company server 230 and the off-premises meeting exchange server 130. Further, connections to certain meeting sites can be turned off from the gateway 238 such that web traffic or meeting traffic to those sites are not allowed.

In an embodiment, a meeting can be configured to be running only on the on-premises meeting exchange server 232 so that no meeting data is transferred to the off-premises meeting exchange servers 130 In an embodiment, a special meeting client can be deployed to follow the security profile provided by the gateway server.

Using these approaches, security policy control of meeting attendees can be implemented based on company policy. Certain features of a meeting can be turned on or off based on the security profile for individual and between the attendees. User features can be different between trusted and non-trusted attendees in the meeting. A single point of control is provided for meeting security and a single point is provided for interfacing to hosted meeting services. Meeting traffic can be limited to within company firewall if the meeting is internal meeting. Meeting recording playback can be restricted to filesystem locations that are behind the company firewall. The system can control access to different sites or services within the hosted meeting service provided by off-premises meeting exchange server 130. The system can provide for reduced company meeting data bandwidth usage since most data will be local to the company.

In an embodiment, policy can be configured on policy server 234 and enforced using hosting logic 236, policy server 234, and/or gateway 238 so that only local recording and playback of online meetings is permitted, to enforce security for the recording files. In an embodiment, policy can require that meeting logging is turned off for all meetings or a particular meeting.

4.0 Implementation Mechanisms—Hardware Overview

Figure 4:
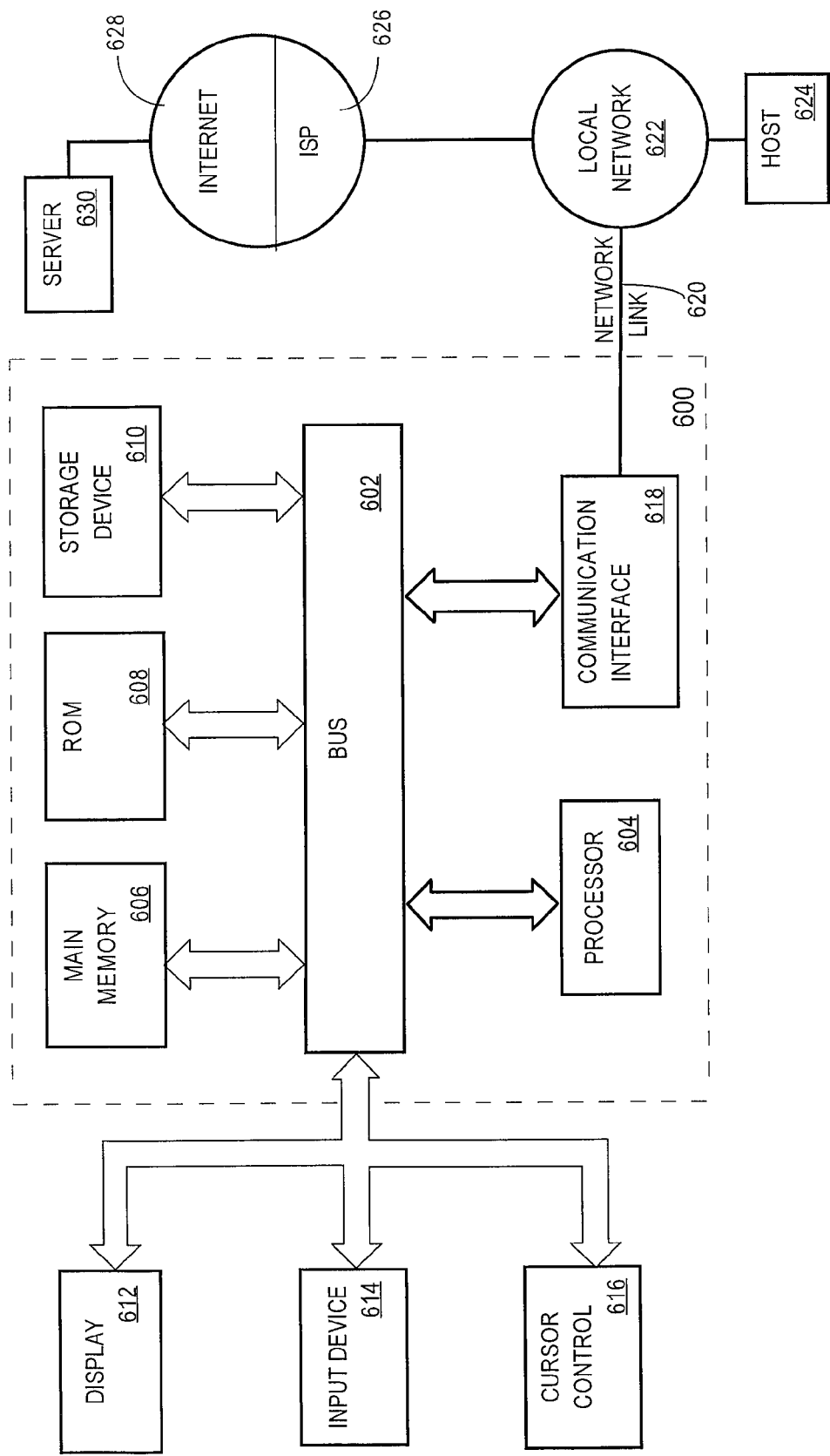
FIG. 4 illustrates a computer system upon which an embodiment may be implemented.

FIG. 4 is a block diagram that illustrates a computer system upon which an embodiment of the invention may be implemented. In FIG. 4, the computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to storage media. Storage media includes both non-volatile media and volatile media. Non-volatile media includes, for example, optical or magnetic disks, such as storage device 610. Volatile media includes dynamic memory, such as main memory 606.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
receiving a request from a client computer to join a web meeting;
determining whether the client computer is within a local network which includes an on-premises-meeting exchange server;
wherein the on-premises-meeting exchange server is configured to manage the web meeting which is accessible to clients at the on-premises-meeting exchange server and at an off-premises-meeting exchange server;
in response to determining that the client computer is within the local network which includes the on-premises-meeting exchange server, joining the client computer to the web meeting at the on-premises-meeting exchange server when the on-premises-meeting exchange server has sufficient capacity; and
in response to determining that the client computer is not within the local network which includes the on-premises-meeting exchange server, joining the client computer to the web meeting at the off-premises-meeting exchange server;
wherein the off-premises-meeting exchange server is in a remote network, and the local network and the remote network represent different domains that are logically separated by one or more public internetworks;
wherein the method is performed by one or more processors.

2. The computer-implemented method of claim 1, wherein the joining the client computer to the web meeting at the on-premises-meeting exchange server comprises:
determining whether the on-premises-meeting exchange server has reached a software and hardware capacity to serve a maximum number of attendees;
in response to determining that the on-premises-meeting exchange server has not reached the software and hardware capacity to serve the maximum number of attendees, applying meeting policies to the client request to determine whether the client request to join the client computer to the web meeting at the on-premises-meeting exchange server can be granted;
in response to determining that the on-premises-meeting exchange server has reached the maximum number of attendees, joining the client computer to the web meeting at the off-premises-meeting exchange server.

3. The computer-implemented method of claim 1, wherein the joining the client computer to the web meeting at the off-premises-meeting exchange server comprises:
determining whether the off-premises-meeting exchange server has reached a maximum number of attendees; and
in response to determining that the off-premises-meeting exchange server has not reached the maximum number of attendees, applying meeting policies to the client request to determine whether to join the client computer to the web meeting at the off-premises-meeting exchange server.

4. The computer-implemented method of claim 3, further comprising:
determining whether the web meeting is hosted at the on-premises-meeting exchange server; and
in response to determining that the web meeting is hosted at the on-premises-meeting exchange server, facilitating a connection between the on-premises-meeting exchange server and the off-premises-meeting exchange server using a secure sockets layer (SSL) protocol.

5. The computer-implemented method of claim 1, wherein the client computer is determined to be within the local network that also includes the hosted on-premises-meeting exchange server when an Internet Protocol (IP) address of the client computer is within a same subnet as an IP address of the hosted on-premises-meeting exchange server.

6. A computer-readable non-transitory volatile or non-volatile medium storing encoded thereon one or more sequences of instructions which when executed by one or more processors cause the one or more processors to perform:
receiving a request from a client computer to join a web meeting;
determining whether the client computer is within a local network which includes an on-premises-meeting exchange server;
wherein the on-premises-meeting exchange server is configured to manage the web meeting which is accessible to clients at the on-premises-meeting exchange server and at an off-premises-meeting exchange server;
in response to determining that the client computer is within the local network which includes the on-premises-meeting exchange server, joining the client computer to the web meeting at the on-premises-meeting exchange server when the on-premises-meeting exchange server has sufficient capacity; and
in response to determining that the client computer is not within the local network which includes the on-premises-meeting exchange server, joining the client computer to the web meeting at the off-premises-meeting exchange server;
wherein the off-premises-meeting exchange server is in a remote network, and the local network and the remote network represent different domains that are logically separated by one or more public internetworks.

7. The computer-readable medium of claim 6, wherein the instructions which when executed cause joining the client computer to the web meeting at the on-premises-meeting exchange server comprise instructions which when executed cause:
determining whether the on-premises-meeting exchange server has reached a software and hardware capacity to serve a maximum number of attendees;
in response to determining that the on-premises-meeting exchange server has not reached the software and hardware capacity to serve the maximum number of attendees, applying meeting policies to the client request to determine whether the client request to join the client computer to the web meeting at the on-premises-meeting exchange server can be granted;
in response to determining that the on-premises-meeting exchange server has reached the maximum number of attendees, joining the client computer to the web meeting at the off-premises-meeting exchange server.

8. The computer-readable medium of claim 6, wherein the instructions which when executed cause joining the client computer to the web meeting at the off-premises-meeting exchange server comprise instructions which when executed cause:

determining whether the off-premises-meeting exchange server has reached a maximum number of attendees; and in response to determining that the off-premises-meeting exchange server has not reached the maximum number of attendees, applying meeting policies to the client request to determine whether to join the client computer to the web meeting at the off-premises-meeting exchange server.

9. The computer-readable medium of claim 8, further comprising instructions which when executed cause:

determining whether the web meeting is hosted at the on-premises-meeting exchange server; and in response to determining that the web meeting is hosted at the on-premises-meeting exchange server, facilitating a connection between the on-premises-meeting exchange server and the off-premises-meeting exchange server using a secure sockets layer (SSL) protocol.

10. The computer-readable medium of claim 6, wherein instructions cause determining that the client computer is within the local network that also includes the hosted on-premises-meeting exchange server when an Internet Protocol (IP) address of the client computer is within a same subnet as an IP address of the hosted on-premises-meeting exchange server.

11. A data processing apparatus, comprising:

one or more processors;

an on-premises-meeting exchange server coupled to the one or more processors;

hosting logic coupled to the one or more processors and when executed operable to perform:

receiving a request from a client computer to join a web meeting;

determining whether the client computer is within a local network which includes the on-premises-meeting exchange server;

wherein the on-premises-meeting exchange server is configured to manage the web meeting which is accessible to clients at the on-premises-meeting exchange server and at an off-premises-meeting exchange server;

responsive to determining that the client computer is within the local network which includes the on-premises-meeting exchange server, joining the client computer to the web meeting at the on-premises-meeting exchange server when the on-premises-meeting exchange server has sufficient capacity; and responsive to determining that the client computer is not within the local network which includes the on-premises-meeting exchange server, joining the client computer to the web meeting at the off-premises-meeting exchange server;

wherein the off-premises-meeting exchange server is in a remote network, and the local network and the remote network represent different domains that are logically separated by one or more public internetworks.

12. The apparatus of claim 11, wherein the logic operable to cause joining the client computer to the web meeting at the on-premises-meeting exchange server comprises logic which when executed is operable to perform:

determining whether the on-premises-meeting exchange server has reached a software and hardware capacity to serve a maximum number of attendees;

in response to determining that the on-premises-meeting exchange server has not reached the software and hardware capacity to serve the maximum number of attendees, applying meeting policies to the client request to determine whether the client request to join the client computer to the web meeting at the on-premises-meeting exchange server can be granted;

in response to determining that the on-premises-meeting exchange server has reached the maximum number of attendees, joining the client computer to the web meeting at the off-premises-meeting exchange server.

13. The apparatus of claim 11, wherein the logic operable to cause joining the client computer to the web meeting at the off-premises-meeting exchange server comprises logic which when executed is operable to perform:

determining whether the off-premises-meeting exchange server has reached a maximum number of attendees; and in response to determining that the off-premises-meeting exchange server has not reached the maximum number of attendees, applying meeting policies to the client request to determine whether to join the client computer to the web meeting at the off-premises-meeting exchange server.

14. The apparatus of claim 13, further comprising logic which when executed is operable to perform:

determining whether the web meeting is hosted at the on-premises-meeting exchange server; and in response to determining that the web meeting is hosted at the on-premises-meeting exchange server, facilitating a connection between the on-premises-meeting exchange server and the off-premises-meeting exchange server using a secure sockets layer (SSL) protocol.

15. The apparatus of claim 11, wherein the client computer is determined to be within the local network that also includes the hosted on-premises-meeting exchange server when an Internet Protocol (IP) address of the client computer is within a same subnet as an IP address of the hosted on-premises-meeting exchange server.

\* \* \* \* \*